United States Patent
Ghosh et al.

(10) Patent No.: US 11,126,894 B2
(45) Date of Patent: Sep. 21, 2021

(54) METHOD AND APPARATUS FOR ANALYSING AN IMAGE

(71) Applicant: SIEMENS AKTIENGESELLSCHAFT, Munich (DE)

(72) Inventors: Sanjukta Ghosh, Nuremberg (DE); Peter Amon, Munich (DE); Andreas Hutter, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 119 days.

(21) Appl. No.: 16/618,550

(22) PCT Filed: Jun. 4, 2018

(86) PCT No.: PCT/EP2018/064618
§ 371 (c)(1),
(2) Date: Dec. 2, 2019

(87) PCT Pub. No.: WO2018/224437
PCT Pub. Date: Dec. 13, 2018

(65) Prior Publication Data
US 2020/0090005 A1    Mar. 19, 2020

(30) Foreign Application Priority Data

Jun. 5, 2017  (IN) .............................. 201711019648

(51) Int. Cl.
*G06K 9/62* (2006.01)
*G06K 9/00* (2006.01)
(Continued)

(52) U.S. Cl.
CPC ....... *G06K 9/6262* (2013.01); *G06K 9/00778* (2013.01); *G06K 9/6282* (2013.01); *G06N 3/04* (2013.01); *G06N 3/08* (2013.01)

(58) Field of Classification Search
None
See application file for complete search history.

(56) References Cited

U.S. PATENT DOCUMENTS

| 10,878,320 | B2 * | 12/2020 | Wierzynski | .......... G06K 9/4628 |
| 2009/0216528 | A1 * | 8/2009 | Gemello | ................. G10L 15/16 704/232 |

(Continued)

OTHER PUBLICATIONS

PCT International Search Report and Written Opinion of International Searching Authority dated Sep. 18, 2018 corresponding to PCT International Application No. PCT/EP2018/064618 filed Jun. 4, 2018.

(Continued)

*Primary Examiner* — Fayyaz Alam
(74) *Attorney, Agent, or Firm* — Lempia Summerfield Katz LLC (57) ABSTRACT

The present embodiments relate to analysing an image. An artificial deep neural net is pre-trained to classify images into a hierarchical system of multiple hierarchical classes. The pre-trained neural net is then adapted for one specific class, wherein the specific class is lower in the hierarchical system than an actual class of the image. The image is then processed by a forward pass through the adapted neural net to generate a processing result. An image processing algorithm is then used to analyse the processing result focused on features corresponding to the specific class.

19 Claims, 4 Drawing Sheets

(51) Int. Cl.
*G06N 3/04* (2006.01)
*G06N 3/08* (2006.01)

(56) References Cited

U.S. PATENT DOCUMENTS

| | | | | |
|---|---|---|---|---|
| 2016/0259980 | A1 | 9/2016 | Mlybari | |
| 2018/0032801 | A1* | 2/2018 | Gur | G06N 3/08 |
| 2018/0129893 | A1* | 5/2018 | Son | G06N 3/063 |
| 2018/0268244 | A1* | 9/2018 | Moazzami | G06N 7/005 |
| 2018/0268296 | A1* | 9/2018 | Zheng | G06N 3/082 |
| 2018/0336672 | A1* | 11/2018 | Perticone | G08B 13/189 |
| 2018/0365564 | A1* | 12/2018 | Huang | G06N 3/08 |
| 2019/0171936 | A1* | 6/2019 | Karras | G06N 3/0454 |
| 2019/0205606 | A1* | 7/2019 | Zhou | G06N 3/0454 |
| 2021/0089816 | A1* | 3/2021 | Amon | G06T 7/143 |

OTHER PUBLICATIONS

Seguí, Santi, Oriol Pujol, and Jordi Vitria. "Learning to count with deep object features." Proceedings of the IEEE Conference on Computer Vision and Pattern Recognition Workshops. 2015. pp. 90-96.

Zhang, Cong, et al. "Cross-scene crowd counting via deep convolutional neural networks." Proceedings of the IEEE conference on computer vision and pattern recognition. 2015. pp. 833-841.

* cited by examiner

METHOD AND APPARATUS FOR ANALYSING AN IMAGE

RELATED CASE

The present patent document is a § 371 nationalization of PCT Application Serial Number PCT/EP2018/064618, filed Jun. 4, 2018, and also claims the benefit of IN Application Serial No. 2017 110 196 48, filed Jun. 5, 2017, which are hereby incorporated by reference.

FIELD

The present embodiments relate to a method and an apparatus for analysing an image using an artificial deep neural network, also denoted as a neural net.

BACKGROUND

Neural nets and deep learning techniques have in the past been successfully used for tasks like image classification, object detection, or semantic segmentation. In most cases, however, the neural nets or models are trained in a supervised manner. This requires the training data to be annotated. If new data are available, annotations are also required in order to update the neural net or model with this new data. Annotations might not always be feasible or practical. As a result the practical availability of new data for updating can be limited. For tasks like object detection that are important in surveillance applications, advanced driver assistance systems, autonomous navigation, or any application where it is required to analyse the environment, annotations of objects in new data may be required in the form of bounding boxes or pixel level segmentation. This can require a considerable investment of time, effort, and money. To achieve the desired results, some applications might also require an update of the neural net when new data from a target site to be analysed become available or if conditions at the target site change significantly.

Another aspect to keep in mind regarding deep neural nets and their training is that they are typically trained for a specific task. In a practical application, however, it might be required to perform not the same task as during the training but a different related task. Approaches to leverage the learned features or classifier to perform this different related task typically also involve re-training the neural net using extensively annotated training data. When a new sample or set of samples to be analysed become available from the target site, these scenarios also require the neural net to be updated, which in turn again requires annotation of the new data.

There exist various approaches to tackle the above-mentioned problems and challenges. One such approach uses pseudo-labelling to label new incoming data. Pseudo-labels can be used in a semi-supervised learning framework for deep neural networks. For example, the respective class with the highest predicted probability can be used as a pseudo-label and treated as if it were a true label. Another approach is to use noisy and incomplete labelling by augmenting the prediction objective with a notion of consistency. A prediction can be considered consistent if the same prediction is made given similar percepts, where the notion of similarity is between deep network features computed from the input data. Another approach clusters objects into visually similar groups and learns deep representations for these groups separately. Another approach lies in treating training as a continuous learning process as new classes of data arrive. Thereby, a capacity of the neural net or model to predict an increasing number of classes is gradually expanded. Classes may be grouped according to similarities, and the newly added capacities can be divided into component models that predict coarse-grained superclasses.

SUMMARY AND DETAILED DESCRIPTION

It is an objective of one or more of the present embodiments to provide a way of analysing new image data using a deep neural net without requiring extensive detailed annotation.

This objective is achieved by a method and an apparatus. Advantageous embodiments with expedient developments are indicated in the claims as well as in the following description and the drawings.

A method according to one present embodiment is concerned with analysing an image. For this purpose, an artificial deep neural net pre-trained to classify images into a hierarchical system of multiple hierarchical classes is provided. The pre-trained neural net is then adapted or specialised for one specific class of the multiple hierarchical classes, wherein the specific class is lower in the hierarchical system than an actual class of the image. The actual class of the image is its correct, objectively true class. The specific class can be provided as an input or parameter. It can also be selected automatically and may therefore also be referred to as the selected class. The automatic selection can for example be done in dependence of the actual class, a predicted class for the image, a type of the image, and/or a respective application or goal of the image analysis. After adapting the pre-trained neural net, the image is then processed by a forward pass through the adapted neural net to generate a processing result. A next act includes analysing the processing result focused on features corresponding to the specific class using an image processing algorithm, in particular a low-level image processing algorithm. Because of the adaption, the adapted neural net is focused on the specific class and therefore the processing result is focused on features corresponding to the specific class. In addition, the image processing algorithm or the image analysis using the image processing algorithm, respectively, may also be focused the features corresponding to the specific class. This can lead to an improved image analysis result, since the image processing algorithm and/or the image analysis can be, in particular automatically, selected and/or adjusted in dependence of the specific class to, for example, detect or prioritize features corresponding to the specific class.

A deep neural net is a neural net including multiple layers. The pre-trained neural net could be trained from scratch, starting with randomly initiated weights and/or other parameters. It could also be pre-trained by transfer learning starting from a baseline neural net trained for general image classification or analysis when it is possible to cast the problem of image analysis as a case where the classes or categories of a classifier are embeddings of each other. This means that the classes form a hierarchical system or structure that can be exploited for image analysis. In the hierarchical system or structure of the classes, each class higher in the hierarchy than another class is a superset of that other class that is positioned lower in the hierarchical system. Lower classes are, in other words, contained in higher classes, meaning that lower classes are more specific.

As an example, the classifier can be a last or highest fully connected layer of the deep neural net. The output of the classifier then gives the probability for a processed input image to belong to the different classes learned by the classifier. In a very simple example, the neural net might be pre-trained for three categories or classes, the first and lowest one being a line, the second and thus next higher one being a plane containing the line, and the third and highest class being a cube containing the plane and thus also containing the line.

Adapting or tuning the neural net for the one specific class allows or forces the neural net to focus on features corresponding to this exact specific or selected class. Starting from the pre-trained neural net, this adaptation or tuning can be achieved by providing training data that is labelled or annotated with the specific class for which the pre-trained neural net is being adapted. Specifically, it is possible to adapt the pre-trained neural net using a backpropagation method, which can for example include running several iterations of gradient descent on a cost function of the neural net.

Due to the hierarchical nature of the classes, using an annotation corresponding to a lower class in the hierarchy is not incorrect, since the input image does have features corresponding to this class. In this case, it is not required to annotate new data with perfect accuracy. As long as the annotation used for the tuning lies lower in the hierarchy then the actual class of the respective processed or analysed image, it is possible to gain new data about or insights into the input data point, that is, the analysed image. Since a simple indication of a class is sufficient as annotation, labelling of data, that is, of images can be done automatically. It is, for example, possible to provide a specific class to be used as a label for multiple images. In this case, the labelling can automatically be applied to each of the multiple images, and the method described herein can still achieve the desired image analysis. This also means that the pre-trained neural net can be adapted online for new data, that is, for new images to be analysed.

Ideally, a model trained for multiple classes would predict the actual class or category of every input image. By using the specific class to adapt the neural net which has already learned the concept of classes, the weights of the neural net are adapted or tuned such that net focuses on features corresponding to the specific, hierarchically lower class. It is a finding underlying the present embodiment that it is extremely difficult to create a neural net to achieve this, if the neural net pre-trained for multiple hierarchical classes is not used as a starting point. Advantageously, the adaptation starting from the pre-trained neural net can be done with significantly fewer iterations then are required for training a new neural net. This allows for a great and efficient flexibility of the presently described method, since the provided pre-trained neural net can be adapted to a specific use case or application on a case-by-case basis automatically or with very limited user input.

In the present description, the term model may refer to a trained, pre-trained, or adapted neural net.

Processing the image by a forward pass through the adapted neural net means that the image is provided as an input to a first or input layer of the adapted neural net, which then works on this input and provides a corresponding result or output at a final or output layer. The forward pass through the neural net therefore includes a data flow from the input layer to the output layer, that is, from the lowest to the highest layer in a hierarchical layer structure of the neural net.

The processing result can for example be an output of the adapted neural net after the forward pass or it can be a certain state or activation of the adapted neural net resulting from or occurring during the processing of the image. It is also possible to do additional processing acts after or besides the forward pass to generate the processing result.

A low-level image processing algorithm as well as low-level image processing in terms of the present embodiment refers to algorithms and methods that are not part of the machine learning domain and/or that are not concerned with the interpretation or classification of a scene or an image as a whole. Rather, these low-level techniques may for example include pixel-based operations, finding corresponding points, edge detection, and the like.

The act of analysing the processing result using the image processing algorithm may for example include highlighting features corresponding to the specific class, isolating and/or focusing on causes, and/or separating the causes or features. A cause in this sense should be understood to be a feature, property, or characteristic of the image that is responsible for, that is, that is causing the processing result or certain parts thereof.

It is an advantage of one present embodiment that there is no strict requirement to correctly annotate images since adapting the pre-trained neural net to a lower-level label in the class hierarchy reveals meaningful features relevant for that specific class and thus gives a meaningful image analysis result.

Compared to conventional approaches, the present embodiment also advantageously facilitates online training since annotation can be easily automated and annotation with less than perfect accuracy does not yield incorrect image analysis results. New data to be analysed can also be used to adapt the model before the new data is analysed fully. The model can therefore easily be updated to any changing statistics or characteristics in the target dataset to be analysed. Since the present embodiment only requires generating the pre-trained neural net once, it can flexibly and quickly be adjusted or customised to different applications or circumstances, because the respective required adaptation can be achieved with comparatively few iterations starting from the provided pre-trained neural net. The present embodiment therefore advantageously allows for quick, easy, robust, efficient, and accurate analysis of new and changing image data. The present embodiment also advantageously facilitates the use of a discriminative model for analysing image data and obtaining insight into this data.

The present embodiment can in principle be used to analyse arbitrary images. Therefore, the term image is to be interpreted broadly and can refer to different kinds of images or image data. An input, that is, an image to be analysed might for example be an image captured by a surveillance camera or a camera that is part of an assistance system of a car. Instead of directly using an image captured by a camera it is also possible to use an image or image data that has been pre-processed in some way. The image can for example be a crop of a larger image that has been subdivided. It is also possible to use as the image an output—for example the contents of a bounding box—resulting from a regional proposal algorithm or object detection algorithm, or a result or an output from a change detection algorithm. Such a pre-processing algorithm, the outputs of which are used as the image to be analysed by the present embodiment, could for example be a low-complexity algorithm operating in the compressed domain. In particular, the image may be a whole image or a crop of an image output by another algorithm that is not capable of separating closely spaced objects or that identifies larger areas compared to the sizes of actual objects present in the respective image.

In an advantageous development of the present embodiment, the processing result is taken from at least one filter of an intermediate layer of the adapted neural net and/or from an output layer of the adapted neural net. It is, in other words, possible to use a state, activation, or output of one or more filters of one or more different layers of the adapted neural net as the processing result to be analysed by the image processing algorithm. Alternatively or in addition it is, of course, also possible to use a final output of the forward pass at the highest layer of the adapted neural net as the processing result. Since the different filters and layers of the adapted neural net correspond to different features and properties of the image, this approach allows for an advantageous customisation of the present method in dependence of the requirements of the respective application and/or in dependence of the image. The filters and/or layers to be used as the processing result may therefore be selected corresponding to a predetermined analysis task and/or in dependence of a predetermined characteristic or type of the image or images to be analysed. Different types of images may be more effectively analysed by using different filters and/or layers as the basis of the processing result. It may, for example, be advantageous to use a filter of a higher layer and one from a lower layer in order for the respective image analysis result to contain data about specific, low-level features of the image as well as data about more general or abstract, high-level features or concepts of the image.

In an advantageous development of the present embodiment, the image is processed by the forward pass and a subsequent backward pass through the adapted neural net to generate the processing result. The backward pass thus constitutes an additional processing act after the forward pass but before using the image processing algorithm to analyse the processing result. In this case, the processing result is or is derived from an output of the backward pass. After the backward pass the processing result is then provided to the image processing algorithm as input to be analysed.

A backward pass through a neural net refers to processing data using the neural net in an opposite direction as compared to the direction of data processing used in the forward pass. The backward pass therefore includes a data flow from a higher to a lower layer of the neural net. After the backward pass, the processing result, that is, the output of the backward pass can represent or resemble an image wherein only features or causes of the original input image belonging or corresponding to the specific class are visible or highlighted. This is the case, because other features of the input image are discarded or disregarded during the forward pass and are not reconstructed during the backward pass. One possibility for implementing the backward pass is to use the transpose of the weights learned by the respective neural net that have been used for the forward pass. Using the additional act of the backward pass can be advantageous since the result or output of the backward pass may be less abstract than the processing result gleaned directly from the forward pass and may therefore be easier to analyse using a conventional image processing algorithm. Using the result or output of the backward pass may therefore lead to an improved result of the image analysis.

Analogous to the above-mentioned processing result of the forward pass, the processing result after the backward pass may also be taken from at least one filter of at least one intermediary layer of the adapted neural net.

In an advantageous development of the present embodiment, a deep convolutional neural net, and/or a deep feedforward neural net, and/or a deep recurrent neural net is used as the deep neural net. The deep neural net can therefore have features or characteristics of one of these types of neural nets or features or characteristics of a combination of some or all of these types of neural nets. This allows for adapting the properties and behaviour of the neural net to different applications. Using a convolutional neural net (CNN) is especially advantageous for image processing and analysis since a high accuracy can be achieved. This is partly because of the implicit assumption of locality. By using a CNN, it is possible to take advantage of the fact that in typical images and with typical objects depicted therein pixels located in the same region of the image are more likely to be related, that is, to belong to the same object, than pixels that are farther away or apart. A disadvantage of conventional approaches using a CNN for image analysis is that large amounts of extensively annotated training data are required to train the CNN. This problem is avoided with the present embodiment by using a pre-trained CNN that has already learned the concept of hierarchical classes and then adapting this CNN for the specific task, use-case, or application. The pre-trained CNN can be trained using synthetic image data. The adaptation or tuning of this pre-trained neural net requires significantly less training data which can also be annotated with significantly less effort.

The present embodiment thus enables the analysis of new images or image data without the need for large amounts of training data and/or extensive labelling or annotations. Especially in the case of using a CNN, a backward pass through the CNN may also be referred to as a deconvolution pass or simply a deconvolution. A deconvolution pass may therefore involve starting from one of the learned filters at a layer of the CNN and doing the reverse data processing acts of successive unpooling, rectification, and filtering to reconstruct the activity in the layer beneath, that gave rise to the chosen activation of the learned filter where the deconvolution pass started. Accordingly, the output of the deconvolution pass may be referred to as deconvolved output.

Feedforward neural nets have the advantage of being very robust, meaning that their performance degrades gracefully in the presence of increasing amounts of noise. Using a recurrent neural net can be especially advantageous for analysing data with a temporal structure, such as for example a time series of multiple images or a video feed.

In an advantageous development of the present embodiment, the pre-trained neural net is used to process the image to obtain a predicted class for the image. This is done before the pre-trained neural net is adapted. The image can, in other words, therefore be automatically pre-classified using the pre-trained neural net. The predicted class can be used as a reference or check. Advantageously, the specific class for adapting the pre-trained neural net is set lower in the hierarchical system than the predicted class. The predicted class can, in other words, be used as an upper boundary for the selection of the specific class. This approach thus allows fully automating the image analysis process. It may also be advantageous to use the predicted class as an initialisation or exit condition. If for example the predicted class is equal to the lowest class in the hierarchical system, further processing of the image may be stopped or cancelled to save the required processing time and effort. This approach could for example advantageously be used to very quickly and efficiently process or classify multiple images.

In an advantageous development of the present embodiment, the pre-trained neural net is adapted online using the image and/or a group of images that are then sequentially processed without further adaptation acts to analyse the image or images. Adapting or tuning the pre-trained neural net online means that the same respective image to be analysed is used prior to its analysis to adapt the pre-trained neural net. This advantageously allows for flexible and accurate use of the presently described method even in practical applications with different and/or changing input data, that is, with variable images to be analysed. Since the respective actual target data is used for the tuning process, this may advantageously result in an improved result of the image analysis. To enable this approach, each image or group of images to be analysed can, in particular automatically, be labelled or annotated. While adapting the pre-trained neural net to every image to be analysed can yield improved or more accurate image analysis results, using the group or a batch of multiple images to adapt the pre-trained neural net and then processing and analysing all images of the respective group can advantageously result in a lower overall processing time needed to analyse all images of the group. Independent of the implemented adaptation variant, this approach can yield accurate image analysis results since the adaptation does not need to rely on training data that differs from the target data, that is, the actual images to be analysed.

It is also possible to adapt the pre-trained neural net offline using pre-selected training data that may include synthetic images and/or natural images, that is, images depicting real scenes. In terms of the present embodiment, offline training or adaptation refers to using training data that differs from the target image or target dataset to be analysed, while online training or adaptation refers to using the same image or target data later to be analysed for training and/or tuning purposes. Offline adaptation can be advantageous, since the training data and therefore the adaptation can be controlled and supervised thus lowering the chance of the neural net to acquire an unintended bias.

Online and/or offline training or tuning can be used for every image or for a group of images.

In an advantageous development of the present embodiment, the analysis of the processing result using the image processing algorithm includes pseudo-colouring and/or highlighting regions based on intensity and/or thresholding and/or contour detection and/or generating a bounding box, in particular a bounding box surrounding a detected contour. These tasks can be automatically carried out using low-level image processing techniques and thus do not require the use of a neural net. Pseudo-colouring can be used to generate or create colour variations based on sine wave generation for different colour channels. Thresholding can be used to discard parts of the processing result having at least one value, such as brightness, intensity, and/or colour, below a predetermined threshold value. Generating a bounding box can advantageously provide a reference area or region assigned to or associated with a detected contour, a detected object, a specific feature, or the like. The bounding box can therefore advantageously be used to indicate a specific part of the image or processing result to a user and/or another program or system. Since the bounding box can be a geometric primitive form, for example a rectangle, this can be done with less processing effort than using a complex detailed outline or shape or segmentation and can thus result in fast and efficient processing, especially in time-sensitive applications. The bounding box may be added to the processing result and/or to the input image.

In an advantageous development of the present embodiment, the pre-trained neural net is pre-trained to count objects in images. The neural net is, in other words, pre-trained to classify images according to a number of objects depicted therein. Each class of the classifier or output layer of the neural net may therefore represent or correspond to a different count of objects. If there are, for example, 16 different classes or categories, the neural net might be capable of classifying images with anywhere from 0 to 15, or 1 to 16, or any 16 different numbers of objects, according to the respective number of objects depicted in each image. Since each of the classes represents a count and a higher class represents a higher account, the lower class is embedded or contained within the higher class. This means that an image with 6 objects is also an image with 5 objects. The classes thus form an embedded or hierarchical structure or system. By adapting the pre-trained neural net for the specific class, which is a sub-set of the actual class of the image, the neural net is able to learn meaningful features corresponding to the sub-class, that is, to the specific class. It may therefore be especially advantageous to adapt the neural net that is pre-trained for counting objects in image data to count exactly one object. Counting one object means focusing on one object and disregarding features belonging or corresponding to other objects that might be depicted in the same image. If there is at least one object present in the image, the adapted neural net will therefore provide a classification of the image of one, meaning that it has counted one of the objects depicted in the image. Tuning with a count of 1 can result in sparse representations in the intermediate layers. Which one of multiple objects depicted in an image is counted can depend on not readily apparent features or characteristics of the specific image and/or a training history of the adapted neural net.

In an advantageous development of the present embodiment, at least one manifestation of the features corresponding to the specific class and/or at least one object corresponding to the specific class is detected in the processing result by using the image processing algorithm to analyse the processing result. A manifestation of the features can be a concrete or specific instance or occurrence of the features. The features may also be an abstract notion, whereas the manifestation is a real part of the image. The method for analysing an image can thus be used as a method for detecting at least one object in an image. Object detection is a common problem in various applications. In applications like surveillance or driver assistance systems or autonomous driving or any application where information about the environment is required, detecting objects is an important task. Moreover, there is often a need to detect specific kinds of objects like pedestrians or vehicles. Especially in scenarios where there are at least two objects close together or occluding other foreground objects, the detection may become challenging though. Combining object detection techniques using the image processing algorithm with processing the image by a neural net pre-trained for counting objects—and especially a neural net that is adapted for counting one object—can yield especially accurate image analysis and object detection results. This is the case even without providing training data, wherein each of multiple objects is outlined and labelled in a detailed fashion. Not only the highest layer of the neural net but also the intermediate layers of the neural net can learn meaningful features of foreground objects to be detected. It can therefore be beneficial to use filters or activations from different layers as the processing result to detect not only objects but to focus on specific features.

In a further advantageous development of the present embodiment, the at least one manifestation and/or the at least one object is detected using at least one predetermined optimisation criterion. This may in particular include using at least one predetermined constraint for a boundary smoothness and/or for an area of the image or processing result. A constraint in this sense may include one or more predetermined threshold values, such that for example a boundary or contour is interpreted to indicate an object if the corresponding boundary smoothness and/or area surrounded by the boundary or contour is greater or smaller than the predetermined threshold value and/or lies between two predetermined threshold values. Different threshold values and/or constraints may be provided and used for detecting different objects and/or different kinds of objects. Using at least one of such predetermined optimisation criterion enables fast and reliable object detection, in particular, since features or causes corresponding to the object to be detected are highlighted or relatively emphasised by processing the image using the adapted neural net prior to using the image processing algorithm.

In an advantageous development of the present embodiment, the at least one manifestation and/or the at least one object is detected by treating pixels of the image or processing result as a Markov random field and using a predetermined constraint on a gradient of intensities. This approach can be especially advantageous since a Markov random field can be used to detect and segment objects in an image simultaneously and can therefore yield fast and accurate object detection and segmentation, as might be required in time-sensitive and/or safety related applications. A Markov random field model can also advantageously be used to detect moving objects with improved accuracy.

In an advantageous development of the present embodiment, in case multiple objects are detected by the image processing algorithm, one of the objects is selected according to a predetermined criterion. Multiple objects might for example be detected due to the tuning of the pre-trained neural net, and/or due to parameters of the low-level image processing or thresholding. Providing a predetermined object selection criterion for selecting one object advantageously allows for reliably marking exactly one object. The criterion advantageously allows for improved flexibility and customisation of the image analysis. Selecting one object can advantageously enhance the capability of the present embodiment to be used for object detection since it strengthens the focus on detecting only a single object at a time.

In a further advantageous development, the criterion is a size of a respective area corresponding to each of the multiple detected objects. The area can for example be enclosed by a bounding box or a detected contour or boundary. For example, the object corresponding to the bounding box having the largest area can be selected. This can be advantageous based on the assumption that the majority of specific regions—for example high-intensity regions—of the image or processing result belong to a single object.

Another aspect of the present embodiment besides the method described herein is an apparatus for analysing an image. The apparatus includes an artificial deep neural net pre-trained to classify images into a hierarchical system of multiple hierarchical classes. The apparatus further includes a separate image processing unit (processor). The apparatus is configured to process the image by a forward pass through an adapted neural net to generate a processing result. The adapted neural net is adapted from the pre-trained neural net for one specific class of the multiple hierarchical classes. The specific class for which the neural net is adapted is lower in the hierarchical system than an actual class of the image. The apparatus is further configured to provide the processing result to the image processing unit. The image processing unit is configured to analyse the processing result focused on features corresponding to the specific class using an image processing algorithm.

The apparatus may include a processing unit (CPU), a memory device, and an I/O-system. In particular, the apparatus according to one or more embodiments may be configured to carry out or conduct at least one embodiment of a method. For this purpose, the apparatus may include a memory device (non-transitory memory) or data store containing a program code representing or encoding the acts of this method. The memory device or data store containing this program code may on its own also be regarded as one aspect. The respective embodiments of the method according to the present embodiment as well as the respective advantages may be applied to the apparatus, the memory device or data store, and/or the program code contained therein, as applicable and vice versa.

Further advantages, features, and details of the present invention derive from the following description of preferred embodiments of the present invention as well as from the drawings pertaining to the present invention. The features and feature combinations previously mentioned in the description as well as the features and feature combinations mentioned in the following description of the figures and/or shown in the figures alone can be employed not only in the respectively indicated combination but also in other combinations or taken alone without leaving the scope of the invention.

DETAILED DESCRIPTION

Figure 1:
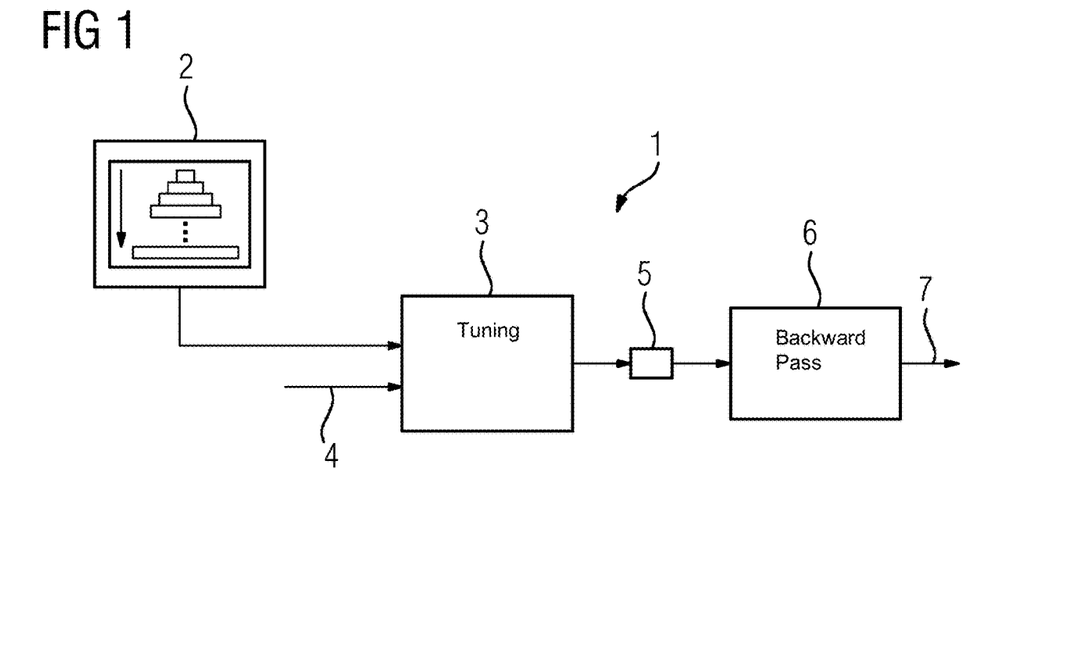
FIG. 1 depicts a schematic illustrating an example basic structure of a method for analysing an image using a neural net trained for hierarchical classes.

FIG. 1 depicts a schematic 1 illustrating a basic structure of a method for analysing an image using a pre-trained neural net 2. The pre-trained neural net 2 presently is a deep convolutional neural net (CNN) trained for multiple hierarchical classes. This means that the pre-trained neural net 2 can classify an input according to the different classes it has learned, wherein each lower class is a subclass of a higher class in the corresponding hierarchical system of hierarchical classes. The direction of the hierarchy is indicated by an arrow pointing from lower to higher classes in the hierarchy. The pre-trained neural net 2 is then adapted or tuned in a tuning act 3 using training data 4 labelled or annotated for or with the specific class. This results in a specialised or adapted neural net 5. In particular, the pre-trained neural net 2 can be adapted for the lowest class or the lowest non-zero class of the hierarchical system of hierarchical classes. This can be advantageous to gain data or insights to a respective processed input about very specific features. Since the pre-trained neural net 2 is to be adapted to a specific class that is lower in the hierarchical system than an actual class of the processed input, using the lowest class for the adaptation enables the greatest number of different inputs to be processed. The input is processed by a forward pass through the adapted neural net 5. An output of this forward pass is then further processed by a backward pass 6 through the adapted neural net 5 to generate a processing result or output 7. The output of the forward pass can be taken from at least one layer or filter of the adapted neural net 5. This layer may be the highest or output layer of the adapted neural net 5 although this must not necessarily be the case. Since the higher layers of the adapted neural net 5 are the most task specific, it is to be expected that the output 7 of the backward pass 6 if the backward pass is started from one of the higher layers can reveal specific features of the original input corresponding specifically to the specific class for which the adapted neural net 5 is tuned. The output 7 can then be analysed focused on features corresponding to the specific class using an image processing algorithm, in particular a low-level image processing algorithm.

Adapting or tuning a neural net can be achieved by running multiple iterations of gradient descent on a corresponding cost function.

If a cross entropy function is used, the cost function can be expressed as $$L(\theta) = -\frac{1}{N}\sum_{i=1}^{N}\sum_{j=1}^{C} t_{ij}\log y_{ij} + \frac{\lambda}{2N}\|w\|_2^2$$

where L is the loss, θ includes the weights w and biases referring not to an individual weight but a whole layer, N is the number of training samples, C is the number of classes, $y_{ij}$ is the predicted class, $t_{ij}$ is the actual class, and λ is a weighting factor. For a single data point, for example for a single image, this simplifies to $$L(\theta) = -t\log y + \frac{\lambda}{2N}\|w\|_2^2$$

where the symbols have the same meaning as mentioned above. If the model trained for all classes is able to correctly predict the label y, a label x is instead used for tuning, wherein x is a subset of y. When iterations of gradient descent are carried out on this cost function, it is minimized when the weights are updated such that the model is able to predict the label for the datapoint as x after tuning. In the process, the model learns to focus on features relevant for the label x.

Figure 2:
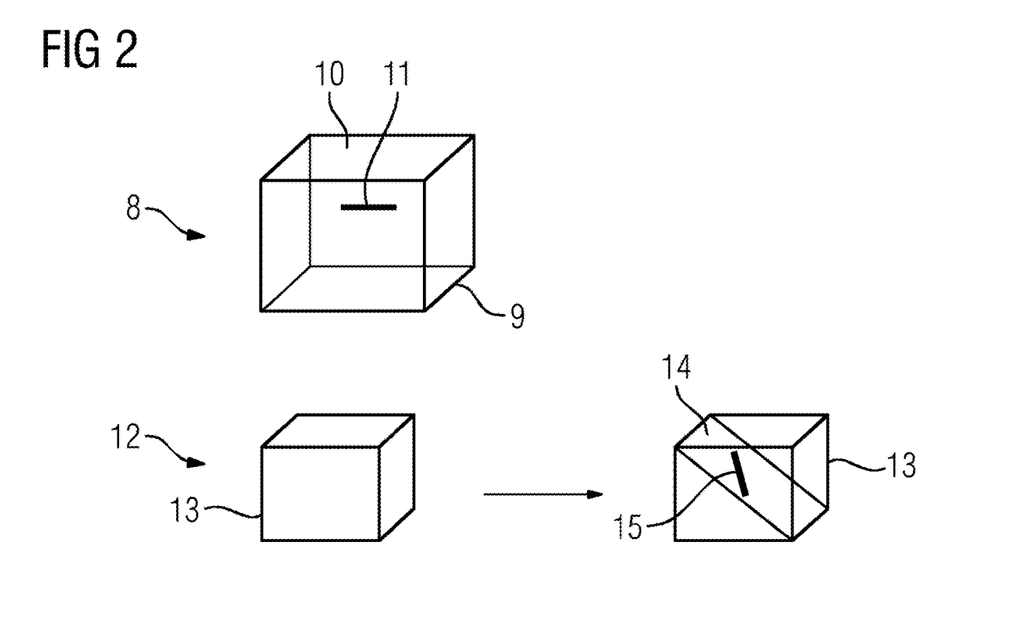
FIG. 2 schematically illustrates an example toy model of objects belonging to different hierarchical classes.

FIG. 2 schematically illustrates a toy model of objects belonging to different hierarchical classes or categories. In this case, the hierarchical system includes three categories that can be understood considering a first sample 8. A lowest or first category is a line 11. A next higher, that is a second category, is a plane 10 containing the line 11. A highest, that is, a third category is a cube 9 containing the plain 10 and therefore also containing the line 11. Thus, the three categories corresponding to the cube 9, the plain 10, and the line 11 form a hierarchical system of hierarchical classes, wherein each class or category contains the lower categories or classes of the system. For the present example, the pre-trained neural net 2 might be trained for these three hierarchical classes. In the tuning act 3, the net 2 can be tuned for the first or lowest category, corresponding to the line 11. When analysing a new data sample 12, which in this case is a second cube 13, even though an actual label or actual class of the second cube 13 is that of the highest or third category, processing the new data sample 12 using the adapted neural net 5 tuned for the lowest category reveals not only the second cube 13 but also a second plane 14 contained therein and a second line 15 contained in the second plane 14.

Figure 3:
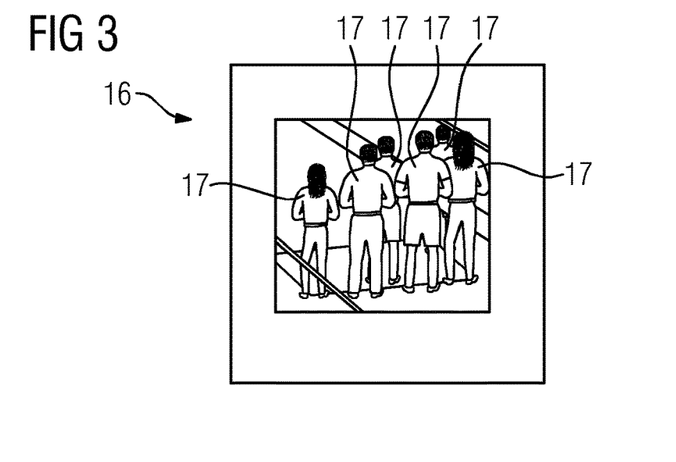
FIG. 3 schematically depicts an example image with six objects.
Figure 4:
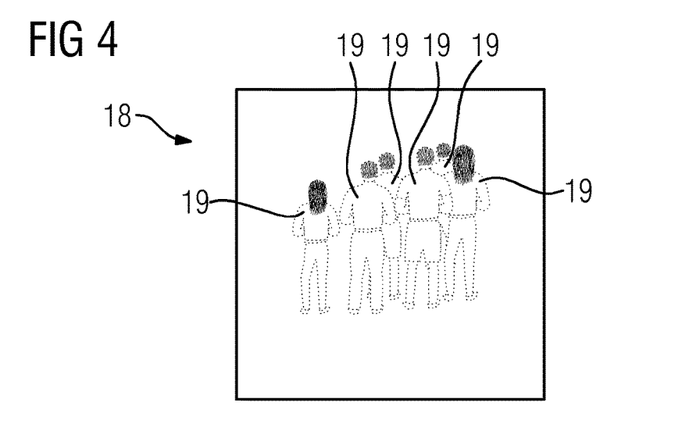
FIG. 4 schematically depicts an example result of processing the image shown in FIG. 3 by a forward and a backward pass through a pre-trained neural net.

In another example the pre-trained neural net 2 might be trained for counting pedestrians in images. FIG. 3 schematically depicts an image 16 showing six closely spaced and partly occluded pedestrians 17. The image 16 can be processed by a forward pass through the pre-trained neural net 2, to obtain a predicted class of the image 16. In this case, the predicted class may be six or lower than six, since the partly occlusion can make it difficult for the pre-trained neural net 2 to count the correct number of objects, that is, all of the pedestrians 17. An output of this forward pass of the image 16 through the pre-trained neural net 2, which has not yet been adapted, followed by a deconvolution pass through the pre-trained neural net 2 yields a processing result, here denoted as deconvolved output 18, which is schematically depicted in FIG. 4. In the deconvolved output 18, inverse representations 19 of all six pedestrians 17 are visible.

Figure 5:
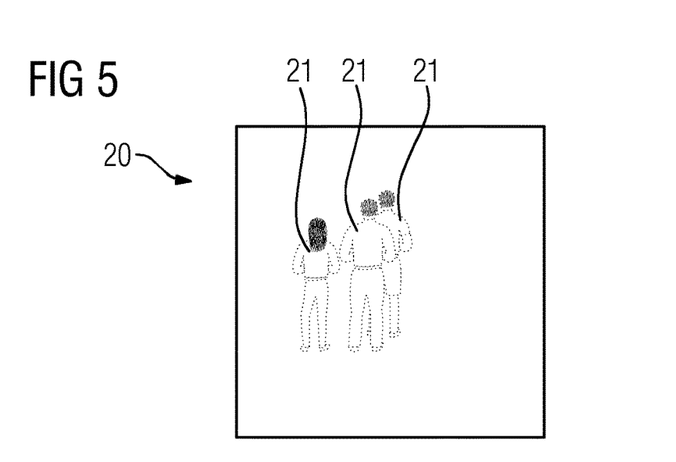
FIG. 5 schematically depicts a result of processing the image shown in FIG. 3 by a forward and a backward pass through a neural net adapted for a class of 3 objects.

The image 16 can be used for online tuning the pre-trained neural net 2 by serving as the above-mentioned training data 4. To adapt the pre-trained neural net 2 for the class of three objects, the label three can be applied to the image 16. With this label, multiple iterations of gradient descent may be executed on the pre-trained neural net 2. After the adaptation is completed, the image 16 can be processed by a forward pass through the adapted neural net 5 followed by the backward pass 6 also through the adapted neural net 5. This yields a processing result 20, which is schematically depicted in FIG. 5. The processing result 20, which corresponds to the output 7, differs from the deconvolved output 18 in that only features 21 corresponding to three of the pedestrians 17 are visible in accordance with the label or specific class of three used for tuning the pre-trained neural net 2.

By adapting the pre-trained neural net 2 for the class three, it is adapted for a class lower than the actual class of the image 16, which lower class is six. The above-mentioned principles can be used to analyse image data and in particular to detect a single object.

Figure 6:
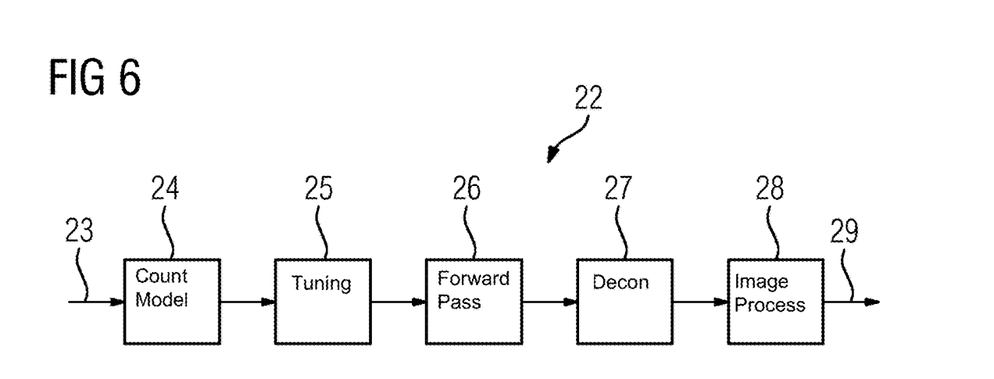
FIG. 6 depicts a schematic illustrating one embodiment of a method for detecting an object in an image using a neural net trained for hierarchical classes.

FIG. 6 depicts a schematic 22 illustrating a method for detecting an object in an image using a neural net trained for hierarchical classes. Below, the schematic 22 and the individual acts for detecting an object are explained referring to FIGS. 7 to 10.

Figure 8:
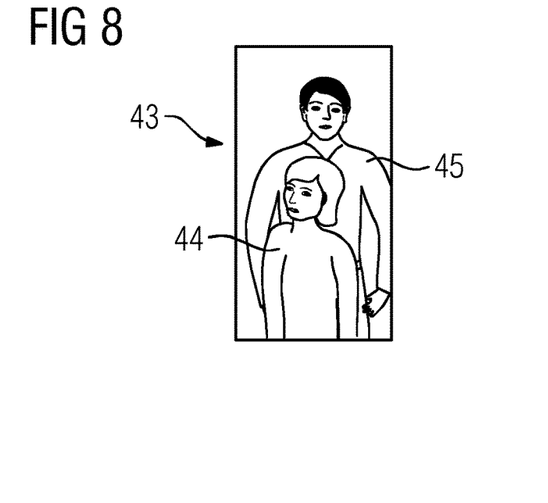
FIG. 8 schematically depicts an example image to be analysed showing two pedestrians, one of whom is partly occluded by the other.

In this example, an input image 23 showing multiple objects is to be analysed to detect one of the objects. An example of the input image 23 is shown in FIG. 8. Here, a crop 43 of a larger image is depicted. The crop 43 contains a first pedestrian 44 and a second pedestrian 45 who is partly occluded by the former. The input image 23, that is, the crop 43, is provided as input to and processed by a counting model 24. The input image 23 undergoes a forward pass through the counting model 24. The counting model 24 is a pre-trained convolutional neural net trained to count objects in images, in this case to classify images such as the crop 43 in dependence of a respective number of pedestrians 44, 45 shown therein. The counting model 24 can be created by transfer learning starting from a baseline neural net trained for general image classification using synthetic and/or natural images.

Figure 7:
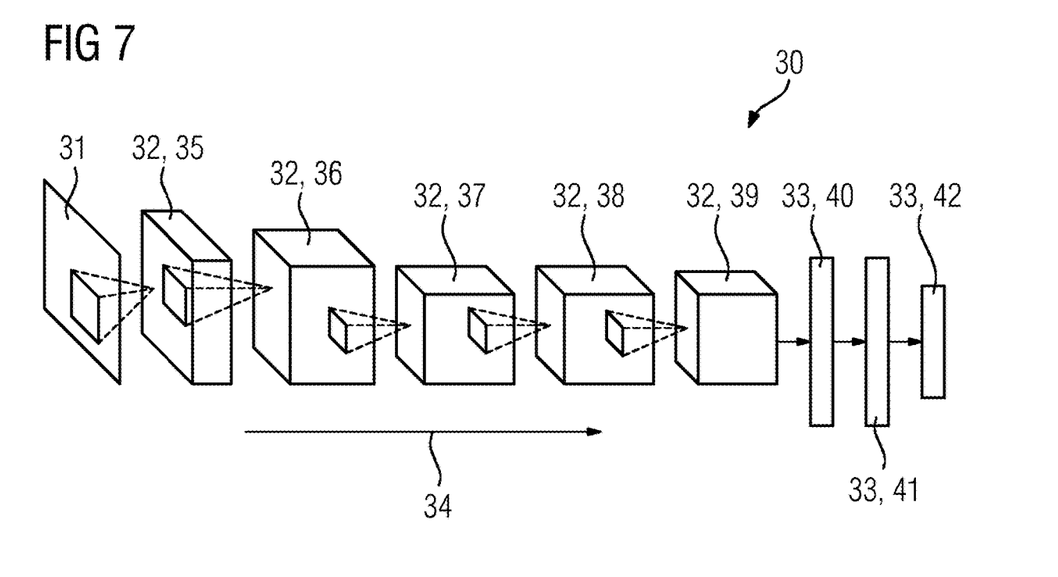
FIG. 7 schematically depicts an example structure of a deep convolutional neural net trained for analysing images.

FIG. 7 schematically shows an example of a layer structure 30 of a deep convolutional neural net such as the counting model 24.

During the forward pass through this layer structure 30 the input image 23—or the crop 43, respectively—is received at an input data layer 31. The input data layer 31 is followed by five convolutional layers 32 which in turn are followed by three fully connected layers 33. The different shapes and sizes of the layers 31, 32, 33 schematically indicate different corresponding dimensions, that is, numbers of neurons and filters. The smaller squares in the input data layer 31 and the first four convolutional layers 35 to 38 indicate respective kernel sizes. In the present example the input data layer 31 may have a size of 227 by 227 neurons with a kernel size of 11 by 11. The first convolutional layer 35 may have a size of 55 by 55 neurons with a thickness of 96 which indicates the number of filters in the direction of the data flow as indicated by arrow 34. The kernel size of the first convolutional layer 35 may for example be 5 by 5. The second convolutional layer 36 may have a size of 27 by 27 neurons with 256 filters. The kernel size for the second convolutional layer 36, the third convolutional layer 37 and the fourth convolutional layer 38 may all be the same at 3 by 3. The third convolutional layer 37 and the fourth convolutional layer 38 may have the same dimensions at, for example, 13 by 13 neurons with 384 filters each. The fifth convolutional layer 39 may have the same size at 13 by 13 neurons but only 256 filters. The first fully connected layer 40 and the second fully connected layer 41 may have 1024 filters each. The corresponding neural net may for example be trained to count 1 to 16 pedestrians. Correspondingly, the third fully connected layer 42, which acts as a classifier, includes 16 classes for the different pedestrian counts from 1 to 16. As part of the corresponding neural net, rectified linear units (ReLUs) may be used as activation functions, while pooling and local response normalisation layers can be present after the convolutional layers 32. Dropout can be used to reduce overfitting.

The forward pass of the input image 23 through the counting model 24 yields a predicted count of objects, that is, pedestrians, for the input image 23. For the crop 43, this predicted count might be two. If, however, a different crop or input image 23 showing zero or one pedestrian, the predicted count might correspondingly be zero or one. The predicted count might be used as an initialisation condition or exit condition. This means that if the predicted count is one or lower, the analysis of the corresponding input image 23 can be stopped. If multiple input images 23 are provided to be analysed the method can automatically jump to the next one. Thus, multiple input images 23 may be processed and analysed one at a time. If, however, the predicted count is greater than one, the following acts of the method, that is, of the image analysis can be initiated.

If the predicted count is greater than one—as is presently the case for the crop 43—the counting model 24 is adapted for a specific class, that is, for an object count lower than the predicted count. This is done in a tuning stage 25. Presently, the counting model 24 is tuned for a count of one to facilitate detecting exactly one object. The tuning can be done by automatically labelling the input image 23 with a class of one and using it as training data. Tuning the counting model 24 results in an adapted counting model tuned for a pedestrian count of one.

The crop 43 is then processed by a forward pass 26 through this adapted counting model to count exactly one object, that is, one of the pedestrians 44, 45. An output or result of this forward pass 26 is then further processed by a deconvolution 27, that is, a backward pass through the adapted counting model. A deconvolved output resulting from the deconvolution 27 is then passed on to an image processing unit, which employs a low-level image processing algorithm 28 to further process and analyse the deconvolved output.

Figure 9:
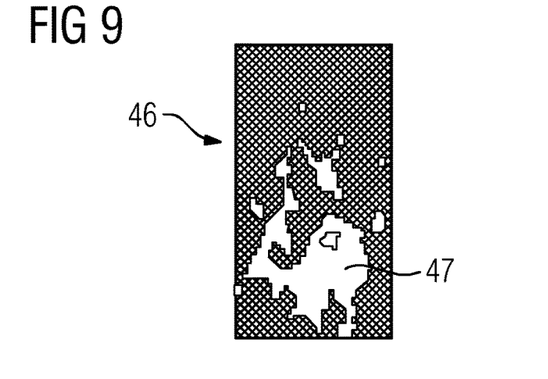
FIG. 9 schematically depicts an example result of several acts of processing the image shown in FIG. 8.

Similar to the processing result 20 shown in FIG. 5, the deconvolved output indicates features or causes of the original crop 43 corresponding to the one counted object, which in this case is the first pedestrian 44. Processing the deconvolved output using the low-level image processing algorithm 28 may include pseudo-colouring and/or highlighting regions of the deconvolved output based on intensity as well as thresholding with a predetermined threshold value to discard any leftover features or noise not corresponding to the counted object. The processing acts carried out by the low-level processing algorithm 28 on the deconvolved output can be summed up under the term post-processing. FIG. 9 schematically shows an intermediary post-processing result 46 after a thresholding act. In the intermediary post-processing result 46 a contour 47 corresponding to the counted first pedestrian 44 is visible. As part of the post-processing done by the low-level image processing algorithm 28 the contour 47 can be detected. This means that a single object can be detected through low-level image processing techniques in image data that has previously been processed using a deep neural net pre-trained for counting objects using a hierarchical class system, wherein the neural net has been adapted to count exactly one object.

The low-level image processing algorithm 28 can also be used to mark the detected object or a region corresponding to the detected object in the deconvolved output, in an intermediary processing result, and/or in the original input image 23. An output of the low-level image processing algorithm 28 can then be considered as a final image analysis result 29.

Figure 10:
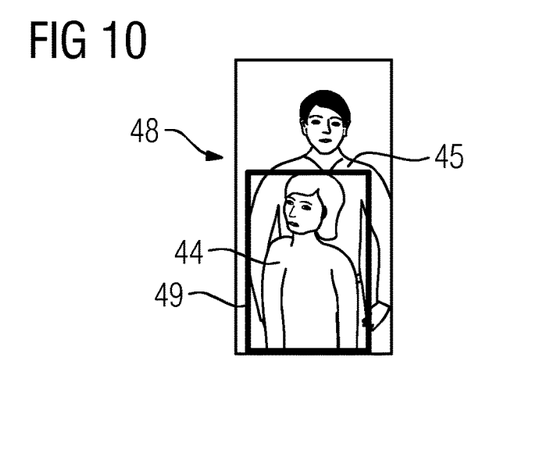
FIG. 10 schematically depicts the example image shown in FIG. 8 complemented with a bounding box surrounding one of the pedestrians.

This image analysis result 29 can in the present example be a post-processing result 48 schematically shown in FIG. 10. The post-processing result 48 may be the crop 43 with an added bounding box 49 surrounding the detected object, that is, the first pedestrian 44.

It is also possible to remove the detected object from the input image 23 to generate a modified image with an actual object count lowered by one compared to the input image 23. To achieve this, the low-level image processing algorithm 28 may be used to replace the area marked by the bounding box 49 with pixels of a predetermined uniform colour and/or intensity. This predetermined colour and/or intensity can also be derived from one or more pixels neighbouring the bounding box 49. In an iterative process the modified image can then be used as the input image 23 for the next iteration act to further analyse the image. In this manner multiple objects in an image can sequentially be detected one at a time.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for analysing an image, the method comprising:
providing an artificial deep neural net pre-trained to classify images into a hierarchical system of multiple hierarchical classes,
adapting the pre-trained neural net for one specific class of the multiple hierarchical classes, wherein the specific class is lower in the hierarchical system than an actual class of the image,
processing the image by a forward pass through the adapted neural net, the processing generating a processing result, and
analysing the processing result focused on features corresponding to the specific class using an image processing algorithm.

2. The method in accordance with claim 1, wherein the processing result is taken from at least one filter of an intermediate layer of the adapted neural net and/or from an output layer of the adapted neural net.

3. The method in accordance with claim 1, wherein the image is processed by the forward pass and a subsequent backward pass through the adapted neural net to generate the processing result.

4. The method in accordance with claim 1, wherein the deep neural net comprises a deep convolutional neural net, a deep feedforward neural net, and/or a deep recurrent neural net.

5. The method in accordance with claim 1, wherein, before the pre-trained neural net is adapted, the pre-trained neural net is used to process the image to obtain a predicted class for the image.

6. The method in accordance with claim 5, wherein the specific class for adapting the pre-trained neural net is set lower in the hierarchical system than the predicted class.

7. The method in accordance with claim 1, wherein the pre-trained neural net is adapted online using the image and/or a group of images that are then sequentially processed and analysed without further adaption acts.

8. The method in accordance with claim 1, wherein the analysis of the processing result using the image processing algorithm comprises pseudo-colouring and/or highlighting regions based on intensity, thresholding, contour detection, and/or generating a bounding box.

9. The method in accordance with claim 1, wherein the pre-trained neural net is pre-trained to count objects in images.

10. The method in accordance with claim 1, wherein at least one manifestation of the features corresponding to the specific class and/or least one object corresponding to the specific class is detected in the processing result by using the image processing algorithm to analyse the processing result.

11. The method in accordance with claim 10, wherein the manifestation and/or the at least one object is detected using at least one predetermined optimisation criterion.

12. The method in accordance with claim 10, wherein the manifestation and/or the at least one object are detected by treating pixels of the image or of the processing result as a Markov random field and using a predetermined constraint on a gradient of intensities.

13. The method in accordance with claim 10, wherein, in case multiple of the at least one object are detected by the image processing algorithm, one of the objects is selected according to a predetermined criterion.

14. The method in accordance with claim 13, wherein the criterion is a size of a respective area corresponding to each of the multiple detected objects.

15. An apparatus for analysing an image, the apparatus comprising:
an artificial deep neural net pre-trained to classify images into a hierarchical system of multiple hierarchical classes, and
a separate image processor, wherein the processor is configured to:
process the image by a forward pass through an adapted neural net to generate a processing result, wherein the adapted neural net is adapted from the pre-trained neural net for one specific class of the multiple hierarchical classes, wherein the specific class is lower in the hierarchical system than an actual class of the image, and
analyse the processing result focused on features corresponding to the specific class using an image processing algorithm.

16. The method in accordance with claim 8, wherein the analysis of the processing result using the image processing algorithm comprises generating the bounding box as surrounding a detected contour.

17. The method in accordance with claim 11, wherein the at least one predetermined optimisation criterion comprises at least one predetermined constraint for a boundary smoothness and/or for an area of the image or the processing result.

18. The method in accordance with claim 4, wherein, before the pre-trained neural net is adapted, the pre-trained neural net is used to process the image to obtain a predicted class for the image.

19. The method in accordance with claim 18, wherein at least one manifestation of features corresponding to the specific class and/or least one object corresponding to the specific class is detected in the processing result by using the image processing algorithm to analyse the processing result.

* * * * *

UNITED STATES PATENT AND TRADEMARK OFFICE
CERTIFICATE OF CORRECTION

PATENT NO. : 11,126,894 B2
APPLICATION NO. : 16/618550
DATED : September 21, 2021
INVENTOR(S) : Sanjukta Ghosh et al.

Page 1 of 1

It is certified that error appears in the above-identified patent and that said Letters Patent is hereby corrected as shown below:

In the Claims

Claim 10 (Line 5):
"least one manifestation of the features corresponding to the"

Should be replaced with:
"least one manifestation of features corresponding to the"

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*